UNITED STATES PATENT OFFICE.

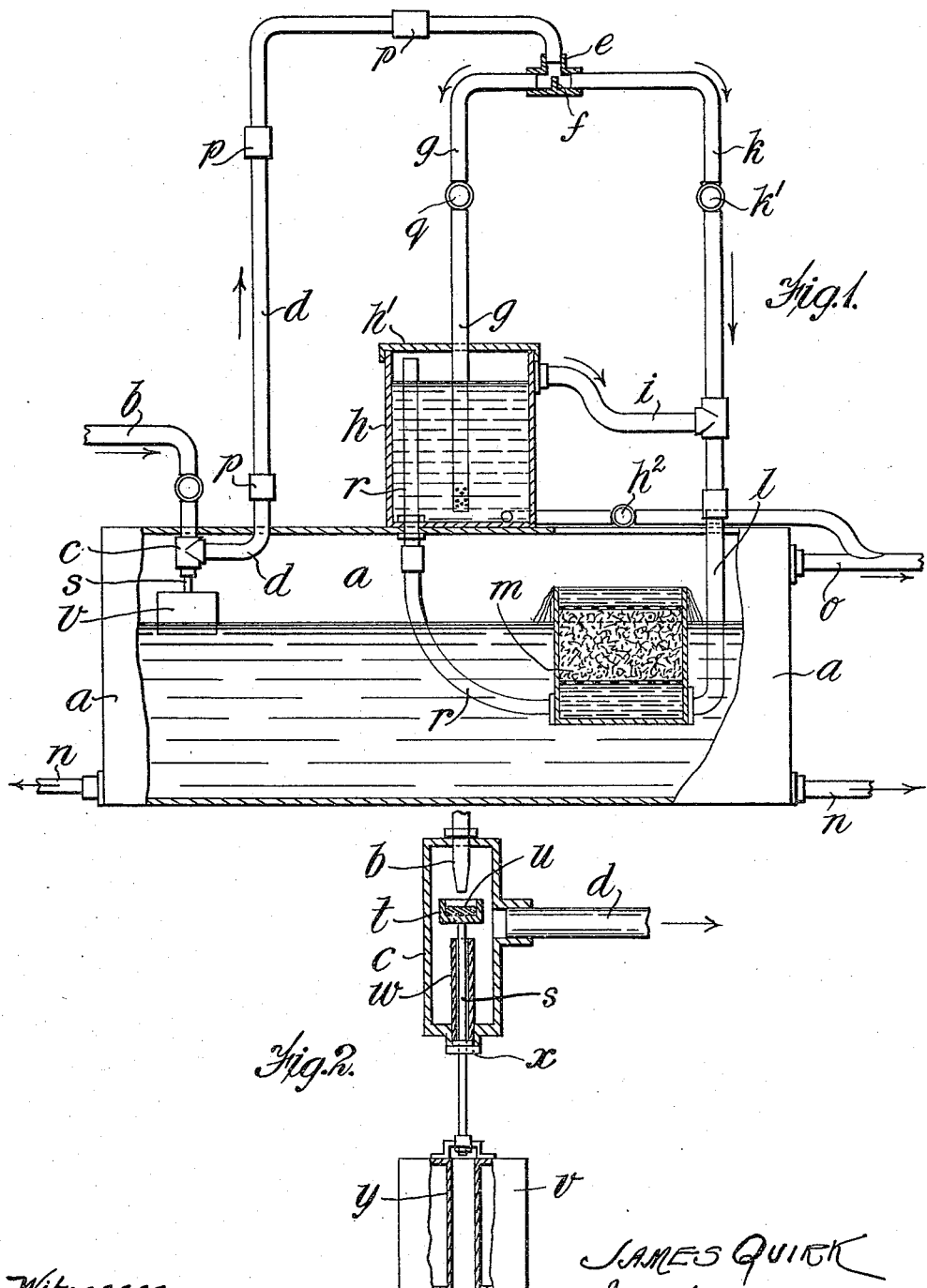

JAMES QUIRK, OF BATH, ENGLAND.

SOFTENING WATER FOR HOUSEHOLD PURPOSES.

1,184,378.   Specification of Letters Patent.   Patented May 23, 1916.

Application filed May 26, 1915. Serial No. 30,566.

*To all whom it may concern:*

Be it known that I, JAMES QUIRK, a subject of the King of Great Britain and Ireland, and resident of Bath, county of Somerset, England, have invented a certain new and useful Improvement in and Relating to Softening Water for Household Purposes, for which I have made application for a patent in Great Britain, No. 13,525, filed June 3, 1914, of which the following is a specification.

This invention relates to softening water for household purposes before it is drawn off from the main tank or cistern for use. To effect such softening it has been proposed to divide the service supply into two parts, the one part which is treated with a suitable reagent, afterward mixing with the other part or hard water, the mixed water then being filtered. In this connection float valves have been employed to control the service supply, and also valves or cocks have been used to control the quantity of water delivered to the softening tank and to the cistern, and also sludge cocks have been provided for cleaning purposes in said softening tank.

The present invention has for its objects the improved combination and arrangement of parts, the means for distributing the hard water and the improved means for controlling the service supply as hereinafter described.

The accompanying sheet of diagrammatic drawings illustrates the manner of carrying out the invention.

Figure 1 is a view partly in section of the apparatus; and Fig. 2 is a vertical section of the float valve controlling the service supply.

Like letters of reference indicate corresponding parts.

In carrying out the invention, water before it reaches the main tank or cistern $a$ from service pipe $b$ has to pass the float valve $c$ and thence by way of conveyer pipe $d$ to a separating device $e$, which device $e$ consists of a T-shaped member having a central division plate $f$ which causes part of the water from pipe $d$ to pass by pipe $g$ into the tank $h$ in which is a strong harmless alkaline solution, said pipe $g$ being closed at the bottom and provided at its lower end with a series of perforations. The water now softened passes from tank $h$ (which may be provided with a cover $h'$) by way of the branch pipe $i$ to the T-piece $j$ where it meets with and automatically mixes with the hard water coming from the separating device $e$ by way of pipe $k$, controlled by valve $k'$.

In some cases the solids or crystals in the alkaline tank may be held by a wire gauze or like cylinder and the water supply pipe from the float valve discharge into said wire gauze or like cylinder. The mixed and softened water then passes by filter intake pipe $l$ to the bottom of the straining and filtering tank $m$ and traveling upward overflows into the main tank or cistern $a$, from whence it is drawn off for use by the pipes $n$. The overflow pipe $o$ from the main tank or cistern $a$ is in practice arranged about one inch above the top of the filtering and straining tank $m$, the top of which is at about an inch and a quarter above the level of the water in the main tank or cistern, said tank $m$ being supported within the main tank or cistern in any suitable manner.

To regulate the water flowing into and out of the softening tank $h$, a valve $q$ is interposed in the pipe $g$ leading from the separating device $e$, which device $e$ equalizes the flow of both pipes $g$ and $k$, so that when the water in the main tank or cistern $a$ is nearly to its top level, the water only dribbles in.

To enable the filtering and straining tank $m$ and softening tank $h$ to be periodically cleaned, a suitable arrangement of unions $p$ is employed so that the various pipes and said tanks $h$ and $m$ may be disconnected, allowing the removal of said tanks $h$ and $m$, the tank $h$ being provided with an overflow pipe $r$ extending into the main tank or cistern $a$ to the bottom of the filter tank $m$, said overflow only acting in the case of stoppage of the pipe $i$. To regulate the flow of hard water from the service pipe $b$ to the uptake or conveyer pipe $d$, there is provided the float valve $c$ which consists of a vertically disposed T-shaped member, to the top of which the nipple end of the service pipe $b$ is connected, while the lower end of said uptake pipe $d$ is connected to the horizontal branch of the T-shaped member. Located below the nipple of the pipe $b$ and carried by a rod $s$ is a metal cup $t$ provided with a rubber or other pad $u$ adapted as the float $v$, which is carried by the lower end of the rod $s$, rises to contact with the nipple of the pipe $b$ and shut off the supply. The rod $s$ passes through a guide tube $w$ and through a suitable stuffing box $x$ at the lower end of the member $c$, and to keep the movement of the float $v$, which is hollow, steady and noiseless, said float $v$ is provided with a central and vertical passage or tube $y$, allowing water to rise therein up to the level of the softened water in the main tank or cistern.

$h^2$ is a valve-controlled waste pipe leading from the bottom of the softening tank $h$ to the overflow pipe $o$ of the main tank $a$, so that any sediment or the like can be drawn off from said tank $h$.

Having now described my invention, what I claim as new and desire to secure by Letters Patent of the United States is:—

1. An apparatus for softening water, consisting of a main storage tank, a service pipe, a softening tank, and a filtering and straining tank, said filtering and straining tank being located interior of the main tank, while the softening tank is arranged exterior thereof and separate therefrom, a supply pipe having means for separating and equally distributing liquid to said softening and filtering tanks, and a float valve located interior of the main tank and having the valve chamber thereof connected to said service pipe, means for regulating the flow from said softening tank, means to enable any waste or sediment to be drawn off from the softening tank, and means to prevent the flooding of the softening tank.

2. An apparatus for softening water comprising a cistern, a service pipe, a conveyer pipe communicating with said service pipe, a valve between the service and conveyer pipes controlled by the level of liquid in the cistern, a softening tank communicating with said conveyer pipe, an intake pipe projecting into the cistern and communicating with said softening tank and conveyer pipe, and a filtering tank at the end of said intake pipe and located within the cistern.

In testimony whereof I have affixed my signature in presence of two witnesses.

JAMES QUIRK.

In witness whereof:
E. J. RUSSELL,
H. WOODS.

Copies of this patent may be obtained for five cents each, by addressing the "Commissioner of Patents. Washington, D. C."